United States Patent [19]

Kaneko et al.

[11] Patent Number: 4,839,915
[45] Date of Patent: Jun. 13, 1989

[54] INVERTER TYPE X-RAY APPARATUS

[75] Inventors: Kazuo Kaneko, Omiya; Takanobu Hatakeyama, Ryugasaki; Hirofumi Hino, Noda; Hideki Uemura, Kashiwa; Kazuo Yamamoto, Ibaraki, all of Japan

[73] Assignee: Hitachi Medical Corp., Tokyo, Japan

[21] Appl. No.: 145,715

[22] Filed: Jan. 15, 1988

Related U.S. Application Data

[63] Continuation of Ser. No. 816,409, Jan. 6, 1986, abandoned.

[30] Foreign Application Priority Data

Jan. 9, 1985 [JP] Japan .................................. 60-1863

[51] Int. Cl.$^4$ .............................................. H05G 1/20
[52] U.S. Cl. ...................................... 378/105; 363/17; 363/26; 378/110; 378/112
[58] Field of Search ............... 378/101, 102, 104, 105, 378/110, 112; 363/17, 26, 41

[56] References Cited

U.S. PATENT DOCUMENTS

| | | | |
|---|---|---|---|
| 4,158,138 | 6/1979 | Hellstrom | 378/110 |
| 4,449,175 | 5/1984 | Ishii et al. | 363/17 |
| 4,449,227 | 5/1984 | Osako | 378/112 |
| 4,601,051 | 7/1986 | Santurtun | 378/105 |

Primary Examiner—Craig E. Church
Attorney, Agent, or Firm—Antonelli, Terry & Wands

[57] ABSTRACT

In an inverter type X-ray apparatus comprising an inverter including a plurality of switching elements operated alternately to generate an AC voltage having a rectangular waveform, a high voltage transformer transforming the AC voltage of rectangular waveform into a high AC voltage, a high voltage rectifier circuit rectifying the high AC voltage into a DC voltage, and an X-ray tube to which the DC voltage is applied as a tube voltage, the switching elements are driven to make chopping operation at a frequency high than the inverter drive frequency, and a pattern signal is generated for gradually increasing the duty cycle of the chopping operation in synchronism with the timing of switching over the switching elements.

12 Claims, 5 Drawing Sheets

INVERTER TYPE X-RAY APPARATUS

This application is a continuation of application Ser. No. 816,409, filed Jan. 6, 1986, abandoned.

BACKGROUND OF THE INVENTION

This invention relates to an inverter type X-ray apparatus, and more particularly to a device effectively applicable to a high voltage generating device in an X-ray apparatus in which an inverter is connected to the input of a high voltage transformer.

A prior art inverter type X-ray apparatus comprises an inverter including four switching elements in a bridge connection, and the switching elements disposed opposite to each other are operated alternately to generate an AC voltage of rectangular waveform. This AC voltage of rectangular waveform is applied to a high voltage transformer to be transformed into a high AC voltage, and, after converting this high AC voltage into a DC voltage by a high voltage rectifier circuit, the DC voltage is applied to an X-ray tube, through a high voltage cable.

One form of such a prior art inverter type X-ray apparatus is shown in FIG. 4.

Referring to FIG. 4, an AC power supply voltage from a commercial AC power source 1 is rectified by a full-wave rectifier circuit I composed of rectifiers 2, 3, 4 and 5, and the output of the full-wave rectifier circuit I is smoothed by a smoothing circuit composed of a winding 6 and a capacitor 7 to provide a DC voltage including a small proportion of ripple components. The output of the smoothing circuit is applied to a chopping circuit II composed of a transistor 8, a transistor drive circuit 9, a free-wheel diode 10, a winding 11, a capacitor 12, and voltage detecting resistors 13 and 14. The ratio between the on-period and the off-period or what is called herein a duty cycle of the switching operation of the transistor 8 is changed depending on a pre-set condition of X-ray exposure thereby regulating the DC output voltage of the chopping circuit II. The output of the chopping circuit II is applied to a full-bridge type inverter circuit III composed of transistor 15, 16, 17, 18, free-wheel diodes 19, 20, 21, 22, transistor drive circuits 23, 24, 25, 26, and an inverter control circuit 41. The DC output voltage of the chopping circuit II is inverted by the inverter circuit III into a high-frequency AC voltage having usually a frequency as high as several hundred Hz, and this AC voltage is applied to a high voltage transformer 27. The output voltage of the high voltage transformer 27 is converted into a DC voltage by a high voltage rectifier circuit composed of rectifiers 28, 29, 30 and 31 and is then applied to an X-ray tube 34 through a high voltage cable. Reference numerals 32 and 33 designate electrostatic capacitances of the high voltage cable. A tube voltage signal EKv proportional to a tube voltage, setting is applied to a tube voltage signal input terminal 38, and a tube current signal EmA proportional to a tube current setting is applied to a tube current signal input terminal 39. An X-ray exposure start signal Exp is applied to an X-ray exposure start signal input terminal 40.

In the prior art X-ray apparatus having such a construction, a tube voltage kV applied to the X-ray tube 34 is regulated by controlling the duty cycle of the chopping operation of the chopping circuit II. A signal for controlling the duty cycle of the chopping operation of the chopping circuit II is produced in accordance with the tube voltage signal Ekv and the tube current signal EmA. Describing this more concretely, a monostable multivibrator 36 connected to an oscillator 35 generates a duty-cycle pulse signal. This pulse signal is amplified by the transistor drive circuit 9 for switching the switching transistor 8, and the output voltage of the chopping circuit II is detected by the voltage detecting resistors 13 and 14. The detected voltage is fed back to a comparator 37 so as to be compared with the duty-cycle controlling signal. Therefore, a stabilized output voltage can be always generated regardless of a variation of the AC power supply voltage applied from the AC power source 1 and, also, regardless of, a load variation occurring when the inverter operates under various load conditions.

Suppose now that the inverter control circuit 41 generates on-pulses each lasting over the half period of inverter operation as shown at (a) and (b) in FIG. 5. In such a case, an input voltage $V_1$ applied to the high voltage transformer 27 has a flat AC voltage waveform having the same peak value, as shown at (c) in FIG. 5. Such an input voltage $V_1$ is applied to the primary winding of the high voltage transformer 27, and the resultant output voltage appearing across the secondary winding of the high voltage transformer 27 is rectified into a DC voltage by the high voltage rectifier circuit composed of the rectifiers 28, 29, 30 and 31. An overshoot Pm as shown at (d) in FIG. 5 appears in the AC-DC rectified tube voltage waveform immediately after the application of the input voltage. Further, undesirable transition tends to occur in the waveform each time the input pulse is applied.

The overshoot Pm and undesirable transition described above tend to increase the undesirable ripple of the tube voltage, thereby lowering the X-ray output and degrading the accuracy of the tube voltage.

Factors giving rise to these problems include a leakage inductance of the high voltage transformer 27, an electrostatic capacitance present between the shield and the core of the high voltage cable and an internal impedance of the X-ray tube 34. These factors are considered to provide the source of undesirable ripple.

SUMMARY OF THE INVENTION

It is a primary object of the present invention to provide an inverter type X-ray apparatus in which means are provided to minimize undesirable ripple of the tube voltage waveform, to improve the accuracy of the tube voltage and to increase the X-ray output.

The above and other features and advantages of the present invention will be apparent from the following detailed description of a preferred embodiment thereof taken in conjunction with the accompanying drawings.

A typical feature of the present invention will be briefly outlined hereinafter.

According to the typical feature of the present invention, there is provided an inverter type X-ray apparatus comprising an inverter including a plurality of switching elements operated alternately to generate an AC voltage having a rectangular waveform, a high voltage transformer transforming the AC voltage of rectangular AC waveform into a high AC voltage, a high voltage rectifier circuit rectifying the high AC voltage into a DC voltage, and an X-ray tube to which the DC voltage is applied as a tube voltage, wherein the switching elements are driven to make the chopping operation occur at a frequency higher than the inverter driver frequency, and a pattern signal is generated for gradually increasing the on period or for varying the duty cycle of the chopping operation in synchronism with the timing of switching over the switching elements, so as to minimize ripple of the waveform of the tube voltage, to improve the accuracy of the tube voltage and to increase the X-ray output.

DESCRIPTION OF THE PREFERRED EMBODIMENT

Figure 1:
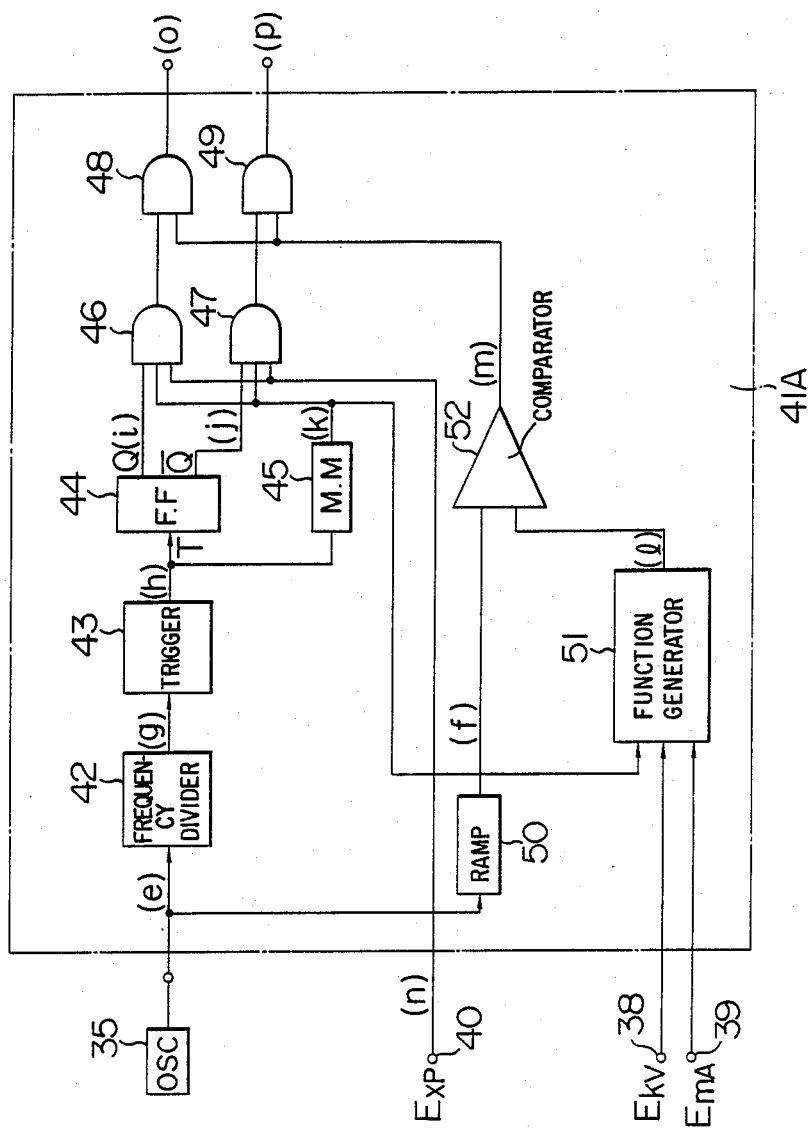
FIG. 1 is a circuit diagram showing schematically the structure of an inverter control circuit incorporated in a preferred embodiment of the inverter type X-ray apparatus of the present invention.

A preferred embodiment of the present invention when applied to an inverter type X-ray apparatus will be described in detail with reference to the drawings.

Throughout the drawings, the same reference numerals are used to designate the same functional parts to dispense with repetition of the same description.

It is the principle of the embodiment of the present invention that the waveform of an input voltage applied to a high voltage transformer is changed or approximated from a rectangular AC waveform tending to cause a ripple on the waveform which will not cause a ripple, to develop thereby suppressing occurrence of the ripple and appearance of an overshoot. The input voltage having a waveform which will not cause the ripple is obtained by performing the high frequency chopping of at least a pair of switching elements disposed opposite to each other among, for example, four switching elements of the inverter, and also by controlling the on-period of the chopping in accordance with a suitable function in synchronism with the inversion period of the inverter. Further, the duty cycle of the high-frequency chopping operation of the switching elements is controlled according to a suitable function in synchronism with the inversion period of the inverter, thereby changing the waveform of the input voltage of the high voltage transformer into a waveform which will not cause the ripple.

Figure 2A:
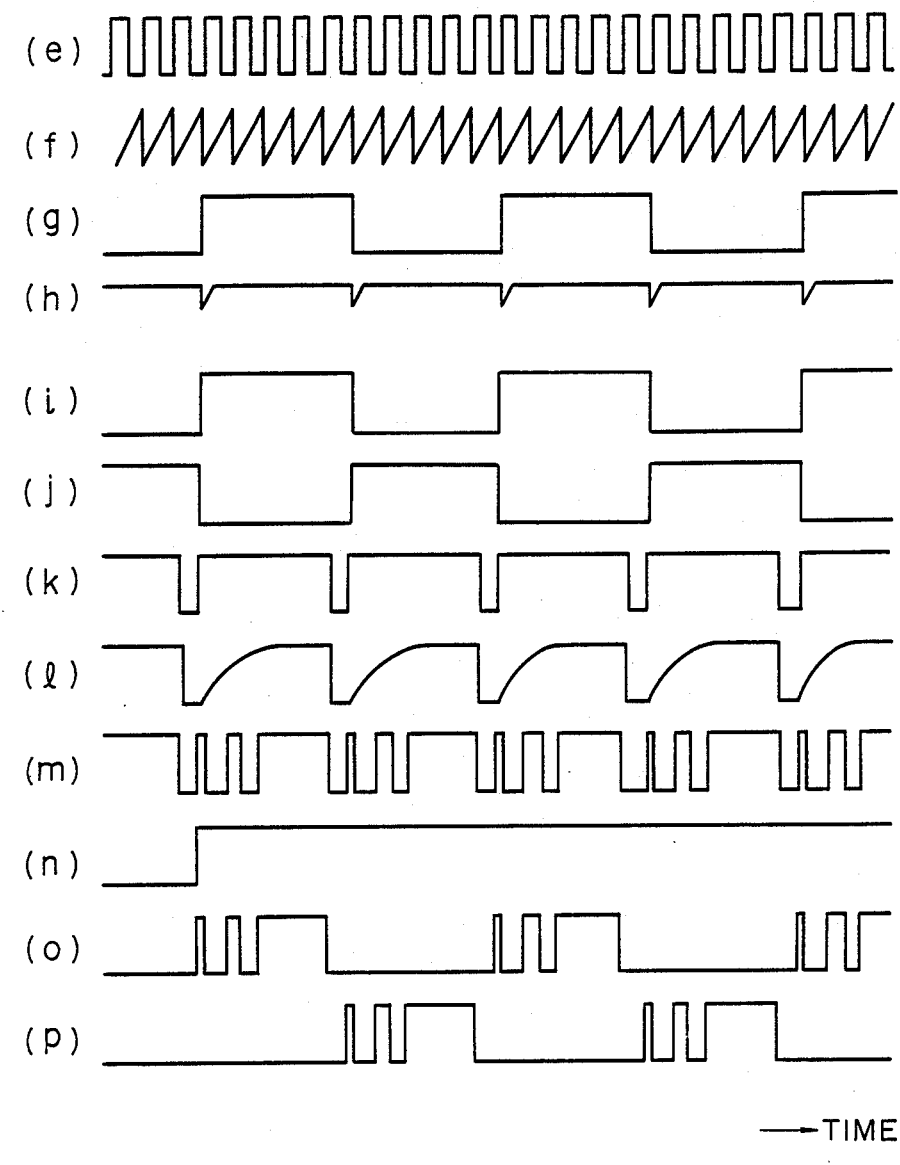
FIGS. 2A and 2B show waveforms of signals appearing at various parts of FIG. 1 for illustrating one operation of the inverter control circuit incorporated in the embodiment of the X-ray apparatus of the present invention.
Figure 2B:
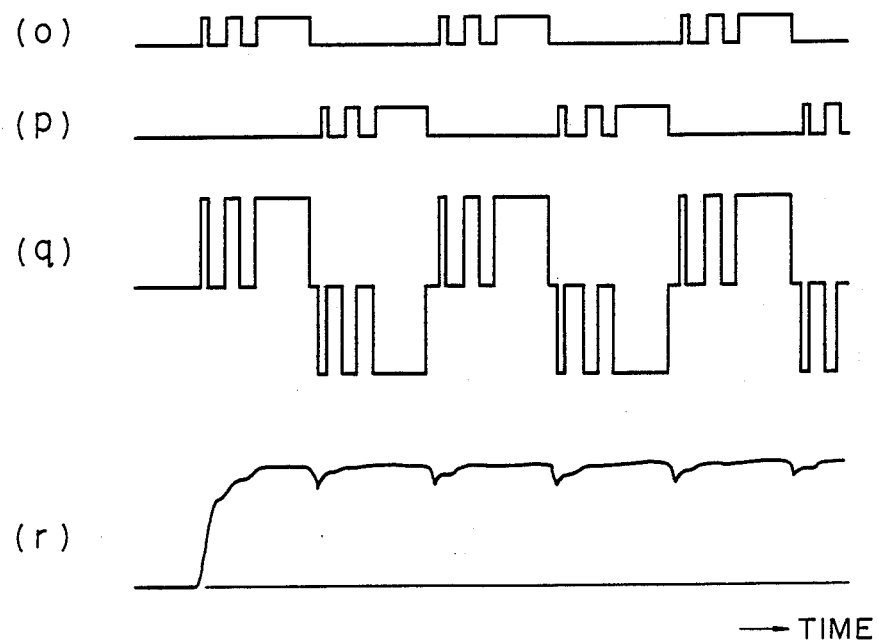

FIG. 1 is a circuit diagram showing schematically the structure of an inverter control circuit incorporated in an inverter type X-ray apparatus for controlling an inverter according to the aforementioned principle of the present invention, and FIGS. 2A and 2B show waveforms of signals appearing at various parts of FIG. 1 for illustrating the operation of the inverter control circuit.

Referring to FIG. 1, the inverter control circuit in the embodiment of the inverter-type X-ray apparatus of the present invention is generally designated by the reference numeral 41A. A frequency divider 42 divides the frequency of an output signal (e) of the oscillator 35 into an operating frequency (g) of the inverter circuit. A trigger pulse generating circuit 43 generates a trigger pulse signal (h) for triggering a flip-flop (F.F) 44 and triggering also a multi-vibrator (M.M) 45 which determines the duty ratio of the switching elements in the inverter circuit III shown in FIG. 4. An output signal (k) of the multivibrator 45 and output signals (i) and (j) of the flip-flop 44 are applied, together with an X-ray exposure start signal (n) applied through the input terminal 40, to AND circuits 46 and 47 as shown.

The ramp voltage generating circuit 50 may be constructed by a switching regulator such as Model HA 17524 (Hitachi), or a circuit including a series connection of a condenser, resistor, and switching elements. A constant voltage is applied to the ramp voltage generator 50 which is triggered by a repeat pulse signal (e) from the oscillator 35 to generate the ramp voltage (f) having a constant maximum value as shown in FIG. 2A. A tube voltage signal EKv proportional to the tube voltage setting and a tube current signal EmA proportional to the tube current setting are applied through the respective input terminals 38 and 39 to a function generating circuit 51 together with the output signal (k) of the multivibrator 45. The tube voltage signal Ekv proportional to the present tube voltage and the tube current signal EmA proportional to the present tube current permit the function generating circuit 51 to generate a pattern signal (l) gradually increasing in a timed relation with the output signal (k) of the multivibrator 45.

Figure 4:
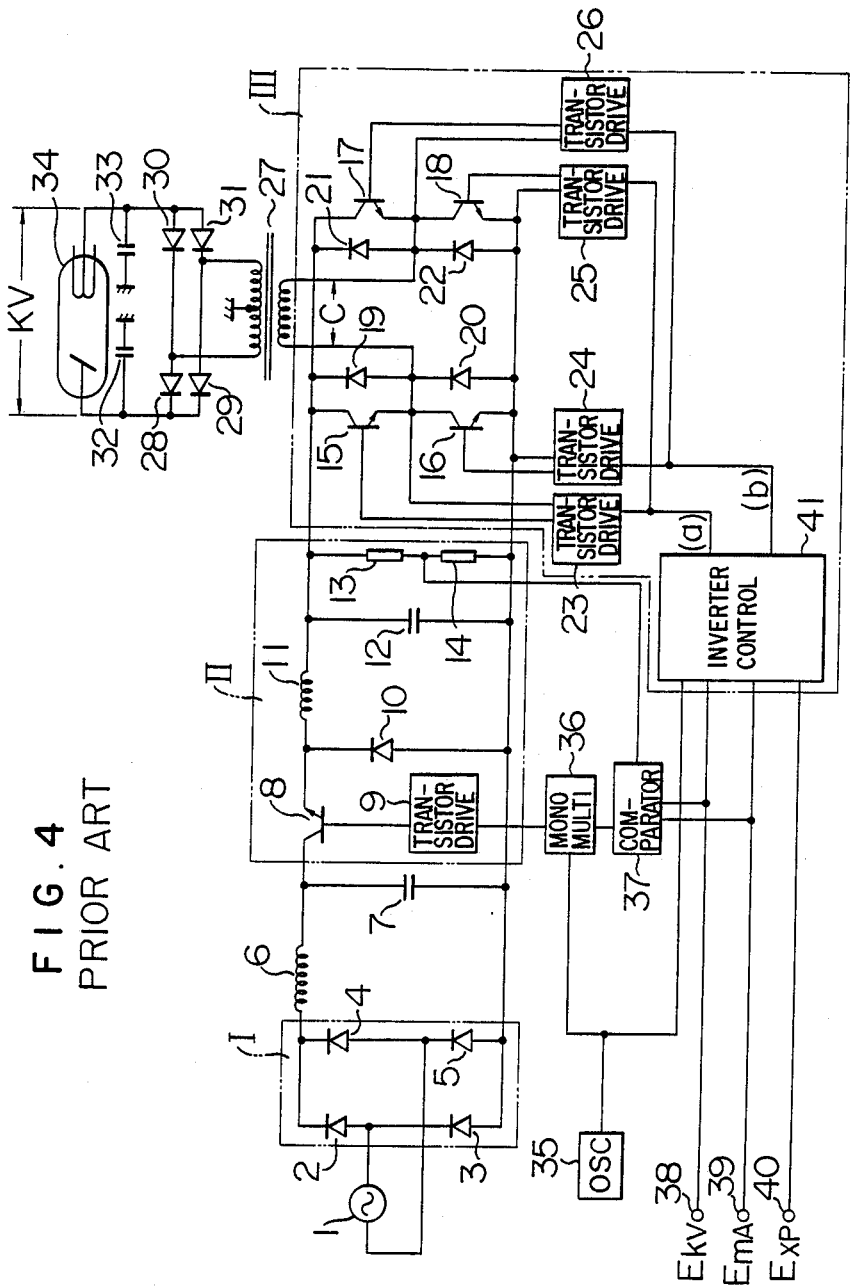
FIG. 4 is a circuit diagram showing schematically the structure of a prior art, inverter type X-ray apparatus to point out problems inherent in the prior art apparatus.
Figure 5:
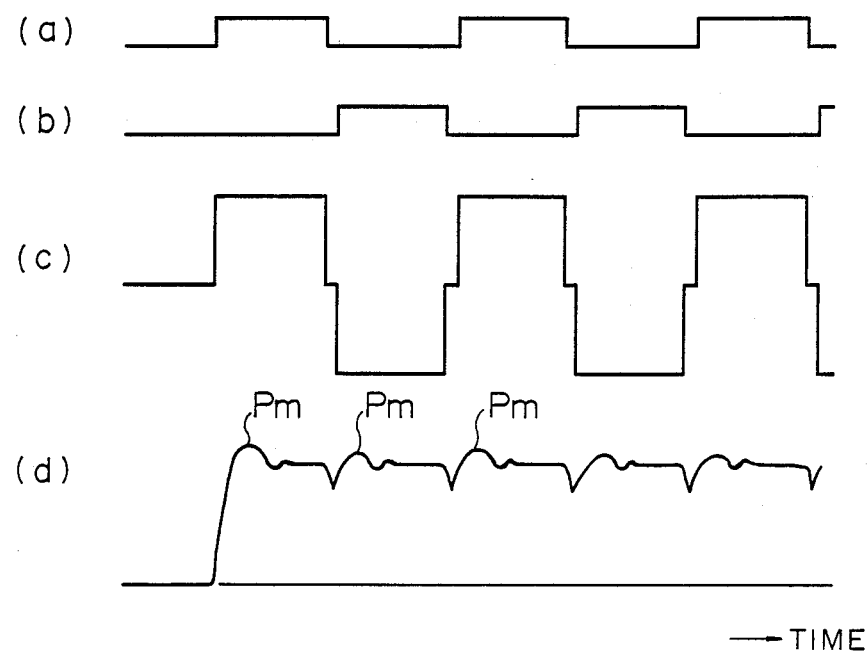
FIG. 5 is a waveform diagram for illustrating the operation of the prior art, inverter type X-ray apparatus shown in FIG. 4.

Referring to FIGS. 2A and 2B, the output signal (e) of the oscillator 35 has a waveform as shown, the ramp voltage output (f) of the ramp voltage generating circuit 50 has a waveform as shown, the inverter circuit III shown in FIG. 4 operates with the illustrated operating frequency (g), and the trigger pulse output (h) of the trigger pulse generating circuit 43 triggering the flip-flop 44 and multivibrator 45 has a waveform as shown. The output signals (i) and (j) of the flip-flop 44, the output signal (k) of the multivibrator 45, and the pattern signal output of the function generating circuit 51, have respective waveforms as shown. The ramp voltage output (f) of the ramp voltage generating circuit 50 and the pattern signal output (l) of the function generating circuit 51 are compared in a comparator 52, and a pattern signal (m) indicative of the duty cycle of the high-frequency chopping operation appears from the comparator 52. The X-ray exposure start signal (n) has a waveform as shown. The pattern signal (m) from the comparator 52 is applied to an AND circuit 48 together with the output signal of the AND circuit 46, and the pattern signal (m) is also applied to an AND circuit 49 together with the output signal of the AND circuit 47. As a result, drive signals (o) and (p) for driving the inverter circuit III appear from the AND circuits 48 and 49 respectively. An input voltage (q) applied to the high voltage transformer 27 has a waveform as shown, and a tube voltage (r) has a waveform as shown.

Figure 3:
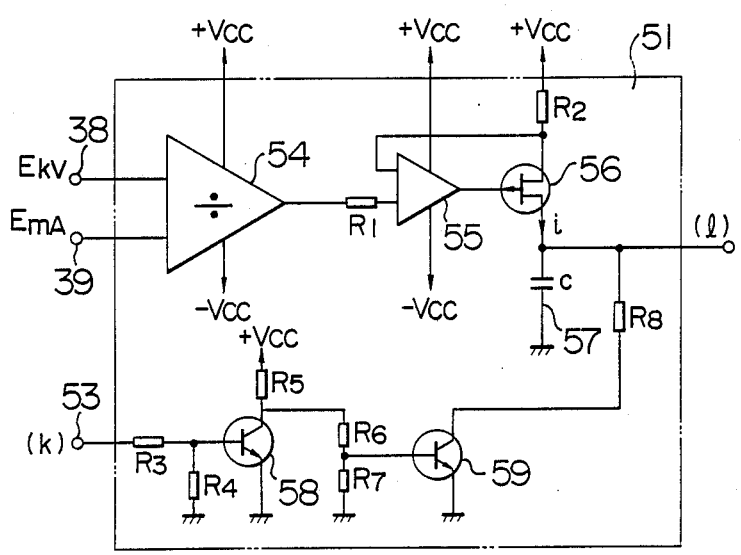
FIG. 3 is a circuit diagram showing in detail the practical structure of the function generating circuit shown in FIG. 1.

FIG. 3 is a circuit diagram showing the practical structure of one form of the function generating circuit 51 shown in FIG. 1.

Referring to FIG. 3, the duty-ratio pattern signal (k) from the multivibrator 45 is applied to an input terminal 53. The tube voltage signal Ekv and the tube current signal EmA are applied from the respective input terminals 38 and 39 to a divider 54 which generates a voltage signal proportional to the ratio Ekv/EmA. An operational amplifier 55 and a field effect transistor (FET) 56 constitute a constant current circuit which generates an output current i that can be regulated by the output voltage of the divider 54. A resistor $R_2$, the field effect transistor 56 and a capacitor 57 constitute an integrating circuit, which generates the output voltage (l). The time constant of this output voltage (l) of the integrating circuit can be controlled depending on the value of the current i, hence, depending on the tube voltage signal Ekv and tube current signal EmA applied to the divider 54. Transistors 58 and 59 constitute a discharge circuit discharging the capacitor 57 during the off-period of the output voltage signal (k) of the multivibrator 45. The function generating circuit 51 includes resistors $R_1$ to $R_8$.

The operation of the embodiment of the present invention will now be described with reference to FIGS. 1 to 3.

Referring to FIG. 1, the output signal (e) of the oscillator 35 is frequency-divided by the frequency divider 42 into the operating frequency (g) of the inverter circuit III shown in FIG. 4. This operating frequency signal (g) is applied to the trigger pulse generating circuit 43, and the trigger pulse signal (h) generated from the trigger pulse generating circuit 43 is applied to the flip-flop 44 and to the multivibrator 45 determining the duty ratio of the switching elements of the inverter circuit III. The output signal (k) of the multivibrator 45 is applied to the AND circuit 46 together with the output signal (i) of the flip-flop 44 and also applied to the AND circuit 47 together with the other output signal (j) of the flip-flop 44. The output signal (k) of the multivibrator 45 is further applied to the function generating circuit 51. The X-ray exposure start signal (n) is applied through the input terminal 40 to the AND circuits 46 and 47.

The output signal (e) of the oscillator 35 is also applied to the ramp voltage generating circuit 50 which generates the ramp voltage (f). The tube voltage signal Ekv proportional to the tube voltage setting and the tube current signal EmA proportional to the tube current setting are applied through the respective input terminals 38 and 39 to the function generating circuit 51 together with the output signal (k) of the multi-vibrator 45. The function generating circuit 51 generates the pattern signal (l) gradually increasing in a relation matching the timing of the output signal (k) of the multivibrator 45. That is, the gradually increasing signal (l) is generated with a certain time constant by means of an integrator composed of the resistor $R_2$, the transistor 56 and the condenser 57 in the function generating circuit 51, since the transistor is reset by the output signal (k) of the multivibrator 45. When the output signal (k) is inputted on terminal 53 in FIG. 3, the transistors 58 and 59 become conductive thereby releasing the charge of the condenser 57 to ground potential. Then, when the signal (k) is off, the condenser c (57) is again charged through $+V_{cc} \rightarrow R_2 \rightarrow$ Transistor 56 $\rightarrow$ condenser c. The time constant due to the resistor $R_2$ and the condenser c at this time correspond to the curved portion of the pattern signal (l).

This pattern signal (l) and the ramp voltage signal (f) are applied to the comparator 52. The comparison between the pattern signal (l) and the ramp voltage (f) is effected each ON period of the output signal (k) of the multivibrator 45, and the comparator 52 outputs the ON-OFF ratio pattern signal (m) in which the signal (m) is ON during signal (l) > voltage (f) and is OFF during l < f with the chopping operation being effected in accordance with the ON part of the signal (m). The ON-OFF ratio pattern signal (m) has the characteristics that the pulse width of the signal (m) is small at the beginning part of the ON period of the output signal (k) and gradually increase at the end part of the ON period of the output signal (k) Furthermore, the signal (m) maintains the ON period thereof when the signal (l) is continuously larger than the ramp voltage (f). The output signals of the AND circuits 46 an and 47 are applied together with the duty-cycle pattern signal (m) to the AND circuits 48 and 49 respectively, and the drive signals (o) and p) driving the inverter circuit III shown in FIG. 4 are generated from the AND circuits 48 and 49 respectively.

When these drive signals (o) and (p) are applied to the inverter circuit III shown in FIG. 4, an input voltage $V_1$ having an AC voltage waveform (q) as shown in FIG. 2B is applied to the high voltage transformer 27. It will be seen in FIG. 2B that this AC voltage waveform includes discontinuous off-periods although the peak value is the same.

However, due to the presence of the leakage inductance of the high voltage transformer 27 and the electrostatic capacitance of the high voltage cable, the output voltage (r) of the high voltage rectifier circuit composed of the rectifiers 28, 29, 30 and 31 is smoothed and has a waveform as shown in FIG. 2B. It will be seen in FIG. 2B that a surge-suppressed tube voltage waveform is obtained. Depending on a pre-set loaded condition of the X-ray tube 34, a slight ripple of the same frequency as that of the ramp voltage (f) may appear in the waveform of the tube voltage. However, this ripple can be substantially minimized when the frequency of the ramp the operating frequency of the inverter circuit III.

Also, the mode of occurrence of an undesirable surge and ripple differs depending on the tube voltage setting and tube current setting. To deal with such a situation, the function generating circuit 51 is arranged so that the pattern signal (l) generated therefrom can be transformed to represent any desired function, depending on the pre-set photographing condition, as shown in FIG. 3.

It will be seen from the above description of the preferred embodiment of the present invention that the switching elements of the inverter circuit III shown in FIG. 4 are driven to produce a high-frequency chopping operation, and, each time the switching elements are switched over, the on-period or duty cycle of the chopping operation is gradually varied or increased according to a pattern signal selected to meet a pre-set photographing condition. Thus, according to the present invention appearance of the transient phenomenon in the waveform of the tube voltage can be suppressed to a minimum. Therefore, ripples resulting from the undesirable surge and ripple can be minimized to increase the X-ray output of the X-ray tube.

Further, the correlation between the inverter input voltage and the tube voltage can be improved by suppressing the transient phenomenon, so that the accuracy of the tube voltage can be improved.

While a preferred embodiment of the present invention has been described in detail, it is apparent that the present invention is in no way limited to such a specific embodiment, and various changes and modifications may be made therein without departing from the subject matter of the present invention.

For example, in the aforementioned embodiment, the drive signals (o) and (p) driving the inverter circuit III shown in FIG. 4 are applied to the transistor drive circuits associated with the opposing transistors respectively in the inverter circuit. However, the drive signals (o) and (p) may be applied to the drive circuits 23 and 26 respectively, and the output signals of the AND circuits 46 and 47 may be applied to the drive circuits 25 and 24 respectively, so that the number of the transistors participating in the chopping operation may be limited to two instead of four.

Also, the switching elements may be gate turn-off thyristors (GTO) in lieu of the transistors.

The state of occurrence of the transient phenomenon in the waveform of the tube voltage immediately after the input voltage is applied to the high voltage transformer 27 differs from that observed after the tube voltage settles in its steady state. In a modification of the embodiment, the waveform of the pattern signal generated immediately after the application of the input voltage to the high voltage transformer 27 is changed over to another pattern signal waveform after attainment of the steady-state tube voltage, or the time constant of the integrating circuit in the former case is changed over to another in the latter case, so as to further suppress the undesirable transient phenomenon by controlling the chopping operation.

The number of times of chopping in the half period of the inverter operation is not especially limited and may, for example, be only one.

An inverter circuit including four switching elements of full-bridge connection is employed in the aforementioned embodiment by way of example. However, a push-pull type inverter may be employed in which the DC power supply terminal is connected to a center tap of the primary winding of the high voltage transformer 27, and a pair of switching elements are connected to the both ends respectively of the primary winding. Such an inverter may be similarly controlled to exhibit effects similar to those described above.

It will be understood from the foregoing detailed description that the present invention provides the following advantages:

(1) Each time the switching elements of the inverter circuit making high-frequency chopping operation are changed over, the on period or duty cycle of the high-frequency chopping operation is varied or, for example, gradually increased according to a pattern signal corresponding to a pre-set photographing condition, so as to suppress an undesirable transient phenomenon occurring in the waveform of the tube voltage.

(2) By virtue of the advantage described in (1), undesirable ripple attributable to the surge can be minimized so that the X-ray output can be increased.

(3) In the case of the prior art apparatus, such a surging waveform gives rise to a worsened correlation between the inverter input voltage and the tube voltage. In contrast, in the apparatus of the present invention, the above correlation can be improved the accuracy of the tube voltage by virtue of the advantage described in (1).

We claim:

1. An inverter type X-ray apparatus comprising:
   an inverter including a plurality of pairs of switching elements to be alternately on-off operated at intervals of a predetermined period to invert a DC input voltage into an AC voltage;
   a high voltage transformer connected to receive said A.C. voltage at a primary winding thereof for boosting said A.C. voltage;
   a high voltage rectifier circuit connected to receive an output voltage from said high voltage transformer for rectifying said output voltage into a DC voltage;
   an X-ray tube to which said DC voltage from the high voltage rectifier circuit is applied;
   an inverter drive circuit connected to said inverter for on-off driving alternately each of said switching elements of said inverter; and
   an inverter controller circuit means for supplying to said inverter driver circuit a control signal for controlling each of the switching elements to perform a chopping operation such that said control signal corresponds to said predetermined period and includes a plurality of increasing on-periods at each starting point of said predetermined period.

2. An inverter type X-ray apparatus according to claim 1, wherein said inverter is a full-bridge type inverter comprising four switching elements and four diodes bridge-connected therewith in anti-parallel connection, respectively.

3. An inverter type X-ray apparatus according to claim 1, wherein a DC input voltage, obtained by full-wave rectifying a commercial AC voltage, is smoothed and adjusted by a converter and applied to said inverter.

4. An inverter type X-ray apparatus according to claim 1, wherein said inverter controller circuit comprises:
   a ramp voltage generator circuit means for generating a sawtooth waveform signal with an oscillating timing of an oscillator means having a predetermined frequency higher than the operation frequency of said inverter;
   a function generator means for generating a function output voltage having an increasing output voltage pattern with time which is variable in accordance with the preset X-ray conditions, said increasing output voltage pattern being cyclically repeated for each half of said predetermined period; and
   a comparator means for comparing the ramp voltage from said ramp voltage generator circuit with the output voltage pattern from said function generator means and for producing an on-off control signal for effecting said chopping operation for each waveform of the ramp voltage based on the result of the comparison.

5. An inverter type X-ray apparatus according to claim 4, wherein one complete on-off control signal is output by the comparator means for each increasing output voltage pattern of the function generator means and wherein the chopping operation is performed when the output voltage of the function generator means is larger than the ramp voltage and is not performed when the output voltage of the function generator means is smaller than the ramp voltage.

6. An inverter type X-ray apparatus according to claim 4, wherein the increasing output voltage pattern of the output voltage of the function generator means is variable in accordance with both the tube voltage and the tube current for the preset X-ray conditions.

7. An inverter type X-ray apparatus according to claim 4, wherein the output voltage pattern for the output voltage of the function generator means is variable in accordance with the tube voltage or the tube current for the present X-ray conditions.

8. An inverter type X-ray apparatus comprising:
   an inverter means including a plurality of pairs of switching elements to be alternately turned on and off at predetermined intervals for a predetermined period, for inverting a DC input voltage into an AC voltage;

a high voltage transformer connected to receive said AC voltage at a primary winding thereof for boosting said AC voltage;

a high voltage rectifier circuit connected to receive an output voltage from said high voltage transformer for rectifying said output voltage into a DC voltage;

an X-ray tube to which said DC voltage is applied from high voltage rectifier circuit;

an inverter driver circuit means connected to said inverter means for on-off driving alternately each of said switching elements; and an inverter controller circuit means for supplying a control signal to said inverter driver circuit means to control the on-off intervals of each said switching elements to perform a chopping operation such that said control signal corresponds to said predetermined period and includes a plurality of increasing on-periods at each starting point of said predetermined period.

9. An inverter type X-ray apparatus according to claim 8, wherein said inverter controller circuit means comprises:

a ramp voltage generator circuit means, connected to an oscillator means and operating in synchronism with the oscillation timing of said oscillator means, for generating a sawtooth waveform signal having a predetermined frequency higher than the operating frequency of said inverter;

a function generator means for generating a function output voltage having an increasing output voltage pattern which is variable in accordance with the preset X-ray conditions, said output voltage pattern being cyclically repeated for each said predetermined period; and a comparator means for comparing the ramp voltage from said ramp voltage generator circuit with the output voltage pattern from said function generator means and for producing an on-off control signal for effecting a chopping operation based on the result of the comparison.

10. An inverter type X-ray apparatus according to claim 9, wherein one complete on-off control signal is output by the comparator means for each increasing voltage pattern output of the function generator means and wherein the chopping operation is performed when the output voltage of the function generator means is larger than the ramp voltage based on the result of the comparison.

11. An inverter type X-ray apparatus according to claim 8, wherein the increasing output voltage pattern of the output voltage of the function generator means is variable in accordance with both the tube voltage and the tube current for the preset X-ray conditions.

12. An inverter type X-ray apparatus according to claim 8, wherein the increasing output voltage pattern for the output voltage of the function generator means is variable in accordance with the tube voltage or the tube current for the preset X-ray conditions.

* * * * *